No. 754,321. PATENTED MAR. 8, 1904.
W. F. KOEPPEN.
DRILLING MACHINE.
APPLICATION FILED SEPT. 29, 1903.
NO MODEL. 2 SHEETS—SHEET 1.
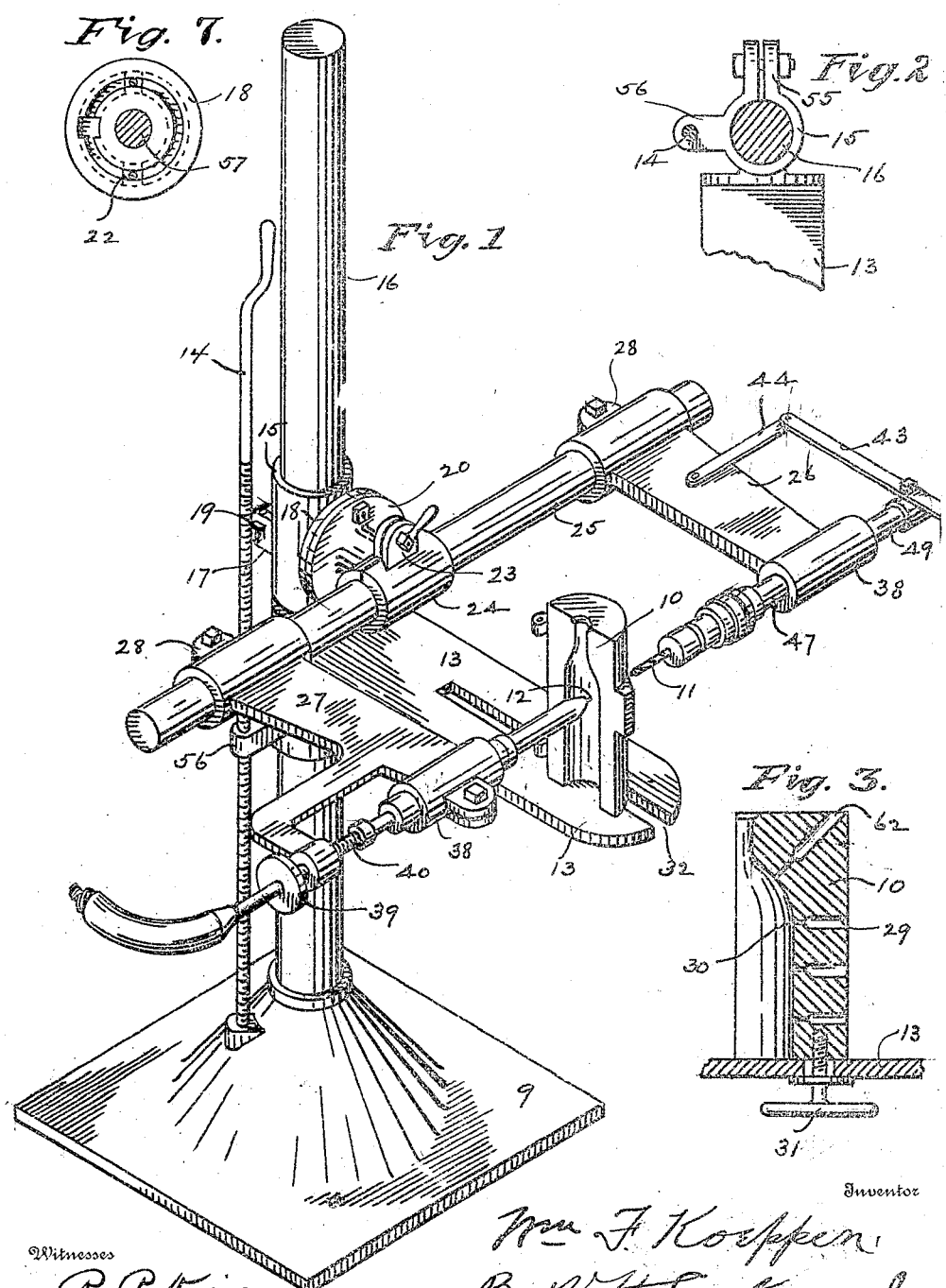
Witnesses
R. P. King
H. Allemong
Inventor
Wm. F. Koeppen
By V. H. Lockwood.
His Attorney

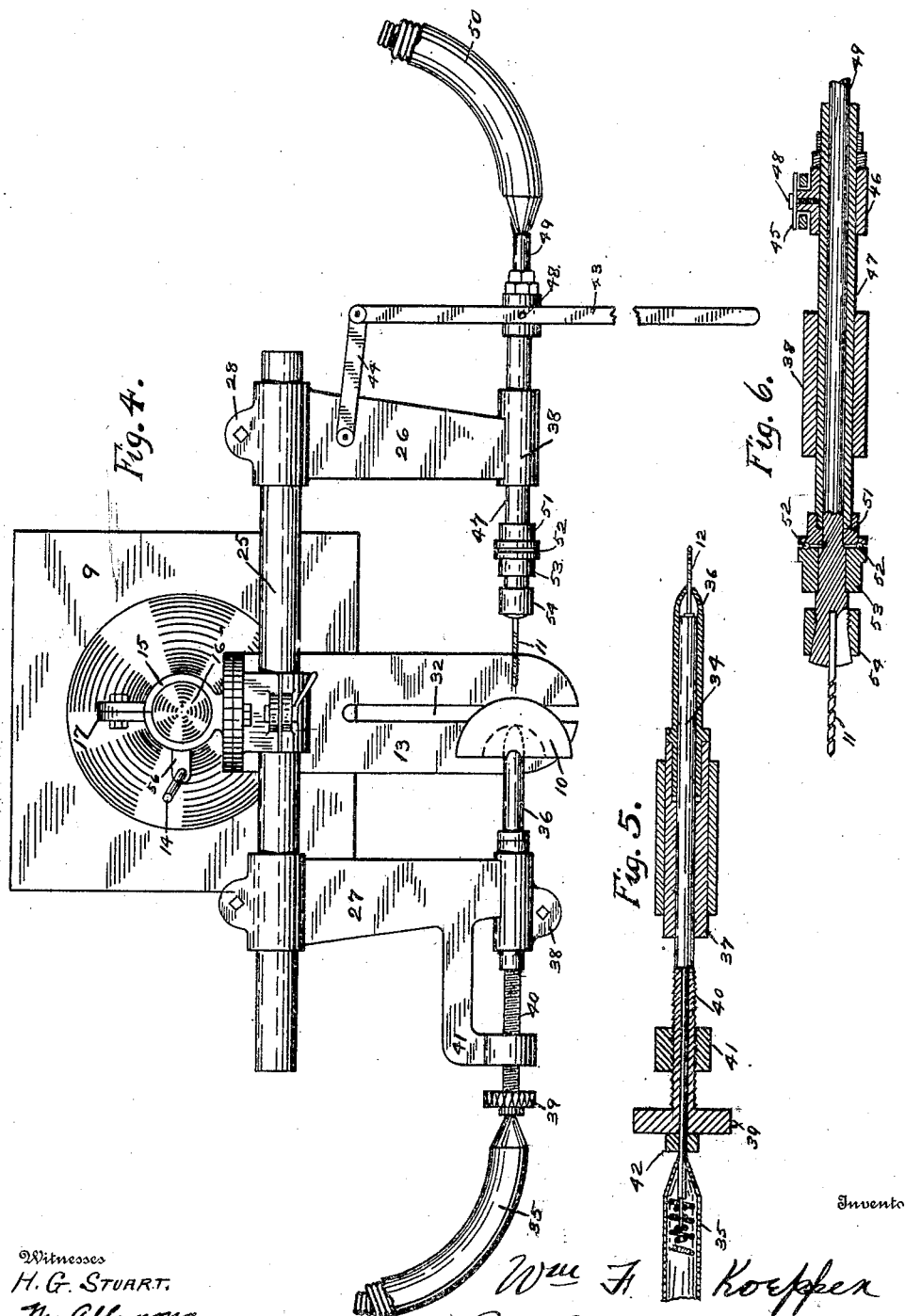

No. 754,321.

Patented March 8, 1904.

UNITED STATES PATENT OFFICE.

WILLIAM F. KOEPPEN, OF MARION, INDIANA.

DRILLING-MACHINE.

SPECIFICATION forming part of Letters Patent No. 754,321, dated March 8, 1904.

Application filed September 29, 1903. Serial No. 175,048. (No model.)

*To all whom it may concern:*

Be it known that I, WILLIAM F. KOEPPEN, of Marion, county of Grant, and State of Indiana, have invented a certain new and useful Drilling-Machine; and I do hereby declare that the following is a full, clear, and exact description thereof, reference being had to the accompanying drawings, in which like figures refer to like parts.
This invention relates to drilling-machines especially adapted for use in the manufacture of molds for making hollow glassware, such as jars and the like. In the manufacture of such molds it is necessary to drill a large number of vent-holes in the molds to facilitate the blowing operation by providing a ready means for the escape of the imprisoned air. At present these holes are drilled in an ordinary speed-lathe, which is a very tedious means, involving considerable time and a large expenditure because of broken drills.

The object of my invention is to provide a simple means whereby these bottle-molds may be clamped upon one part of the drill-frame and each of the various vent-holes, both large and small, being drilled with one setting of the machine. This machine also does away with any great likelihood of broken drills.

An important feature and result of my construction is that it drills from both directions and keeps both drills in line no matter at what angle the work is done.

The full nature of this invention will be understood from the accompanying drawings and the following description and claims.

In the drawings, Figure 1 is a perspective view of the machine, showing a bottle-mold in position for drilling. Fig. 2 is a horizontal section of a portion immediately over the table, parts being broken away. Fig. 3 is a section of the mold, showing the holes therein. Fig. 4 is a plan view of the machine. Fig. 5 is a central longitudinal section of the feeding device which carries the small drill.
Fig. 6 is a similar sectional view of the feeding device which carries the large drill. Fig. 7 is a detail of the disk on which the drill-frame turns.

In detail, 9 is a base formed of the casting, with a central hollow conical projection, in which a standard or upright 16 is rigidly secured. On this standard the mechanism is mounted. In the first place I mount a table 13 on said standard by means of a pair of clamping members integral with the base that surround said standard and which are secured by a screw 55, as shown in Fig. 2.

The table is vertically adjustable on the standard 16 by loosening the screw 55, and when thus loosened the table is temporarily supported by the screw-rod 14, that extends through a threaded aperture in the bracket 56 from the table, as shown in Figs. 1 and 2. Said screw-rod 14 is rotatably mounted at its lower end in the conical portion of the base and at the upper end is bent to form a crank, whereby it may be rotated to elevate or lower the table 13 when the clamp thereon is released, as stated. When the table is moved to its desired position by the screw-rod 14, it is again clamped rigidly in place on the standard.

Above the table 13 a sleeve-bracket 15 is loosely mounted on the standard, so it can be turned, if desired. It is split at the back, and each side has rearwardly-extending ears 17, that have a bolt 19 extending through them, whereby said bracket may be tightened and held stationary on the standard 16 when desirable. Integral with the front side of the bracket 15 there is a circular vertically-disposed plate 18, with a central hole in it to receive the spindle 57, that extends centrally from a disk 20. Plate 18 has in it an annular slot 22, through which headed screws 21 extend loosely, that are secured in the disk 20 to bring the drill or controlling mechanism into the desired position for work. Said plate 20 carries a split sleeve-like bracket 24 integral with the front face and disposed substantially horizontal, in which a horizontal rod 25 is placed and clamped by the screw 23. This rod 25 carries at its ends the brackets 26 and 27, which are likewise clamped on said rod by the screws 28.

On the outer end of the bracket 26 there is a sleeve 38, through which a tube 47 extends, that carries a shaft 49, that carries the large drill 11. The tube 47 is longitudinally slidable in the sleeve 38 by means of the lever 43, pivoted on an upwardly-extending lug from the collar 46 and is held on this pivot by a washer 45 and a headed screw 48, as appears in Fig. 6. Said lever is fulcrumed to the bar 44, that is pivoted to the arm 26. The inner end of the tube 47 is externally threaded to receive the bearing-collar 51, which coöperates with the collar 53, that is secured on the shaft 49 to form a ball-race for the balls 52. This arrangement makes a bearing to resist the end thrusts of said shaft while drilling. The inner end of the shaft 49 is split to receive the drill 11 and is externally threaded for the nut 54 for clamping the split ends of the shaft to hold the drill. Said shaft 49 is driven by an ordinary flexible shaft 50.

This drilling mechanism just described is horizontally disposed, and opposite it there is another drilling mechanism carried by the arm 27. Said arm 27 has on its outer end a split sleeve 38, which is clamped about the tube 37 by a suitable screw, as shown in Fig. 5. This tube 37 carries the shaft 34, in which the small drill 12 is mounted. There is a guide 36 for the drill 12, that is mounted in the inner end of the tube 37 and surrounds the shaft 34 and extends inward beyond the shaft some distance, the inner end of said guide 36 enveloping the drill to reinforce and guide the same. The tube 37 and the guide 36 are not rotatable during the operation of the drill. This guide 36 may be adjusted so as to bring its inner end closer to the inner end of the drill 12, if desired, by releasing the clamped or split sleeve 38 and moving the tube 37 inward to bring about the proper position of the guide 36, and then said tube 37 is clamped again. The small drill is fed up to its work by more sensitive mechanism than the large drill. A branch arm 41 extends from the arm 27 and has an internally-threaded bearing for a threaded sleeve 40, that surrounds the turned-down portion of the outer end of the shaft 34, as shown in Fig. 5. Said sleeve 40 carries a finger-wheel 39 for rotating the sleeve for feeding the shaft 34 and the drill. A stop-block 42 is secured to the turned-down portion of the shaft outside of the finger-wheel 39, so that when the threaded sleeve 40 is turned backward it will withdraw the shaft 34 and the wheel from the work. This shaft 34 is driven by the flexible shaft 35. As appears from the foregoing description, these drills 11 and 12 and their holding and actuating mechanism are placed in opposing positions, so that the drills will be on opposite sides of the mold 10, through which it is desired to drill holes. These holes appear in Fig. 3 and consist of an outer enlarged portion that is drilled by the large drill 11 and an inner very small portion that is drilled by the small drill 12. For drilling these holes the mold 10 is clamped on the table 13 by the hand-wheel 31, that is connected with the screw which extends up through a slot 32 into the lower part of the mold.

The mode of operation is as follows: The point of the drill 11 and the point of the guide 36 being adjusted, by means of the tube 37 and the collar 46, the proper distance apart which it is intended the small drill 12 shall penetrate, the mold 10 is then clamped in place on the table 13, as shown, after the table 13 has been raised or lowered by means of the screw-rod 14 to bring the mold in proper position vertically. The table 13 is then moved horizontally to bring the inner surface of the mold 10 in contact with the end of guide 36 at a point in the mold 10 where a vent-hole is desired. The drill 11 is then moved up by the lever 43 and the large portion of the horizontal holes 29 are drilled. The drill 11 is then removed by the lever 43, and the drill 12 is then fed by the wheel 39, and thus the small portion of said horizontal holes are drilled. It is observed that said horizontal holes are at various elevations, so that it is necessary in changing the drill from one position to the other in drilling said holes to release the screw 23 somewhat and lower the drill-holders or elevate them and then tighten said screw 23. After the horizontal holes are drilled if there are any oblique holes, such as the hole 62, the screw-bolt 21 must be released and the shaft 25 tilted to bring the drills in the desired oblique position. The bolt 21 is then tightened and the oblique holes are drilled. It is thus observed that the drills can be adjusted to varying positions so far as elevation is concerned, and the drill-holders can be tilted so as to bring them into any oblique position desired. If it is desired to drill a plurality of holes on the same level, the position of the mold itself is then altered by releasing the clamping-wheel 31, adjusting the position of the mold, and reclamping it in place. Consequently holes may be drilled through said mold in any radial direction or in any horizontal or in any oblique direction.

To adjust the drills for drilling holes of various positions vertically, instead of releasing the screw 23, as explained, the table 13 may be elevated or lowered by the screw-rod 14, so as to change the position of the drills to bring about the same result.

What I claim as my invention, and desire to secure by Letters Patent, is—

1. A drilling-machine including means for holding the work stationary, opposing drill-holders and actuators in line with each other, and means for mounting said drill-holders and actuators so that they may be readily changed to various elevations and to various degrees of obliquity.

2. A drilling-machine including a standard, a substantially horizontal rod, means for mounting said rod on said standard so that the rod may be rotatable and also obliquely adjusted, suitable drills, and means for holding and actuating said drills that are mounted on said rod so as to be oppositely located and in line with each other.

3. A drilling-machine including a round standard, a bracket releasably clamped thereon having on one side a vertically-disposed disk, another disk rotatably mounted on said bracket-disk, means for clamping said rotatable disk in the desired position, a split sleeve carried by said rotatable disk, a rod carried in said split sleeve whereby the same may be releasably clamped on said rod and extending therefrom parallel with each other, suitable drills, and drill-holders and actuators mounted in the outer ends of said arms opposite to and in line with each other.

In witness whereof I have hereunto affixed my signature in the presence of the witnesses herein named.

WILLIAM F. KOEPPEN.

Witnesses:
 FRANK. BROWALEN,
 MASON SPROAT.